Jan. 22, 1929.
A. O. APPELBERG
1,699,940
THERMOSTATIC SWITCH
Filed March 21, 1923
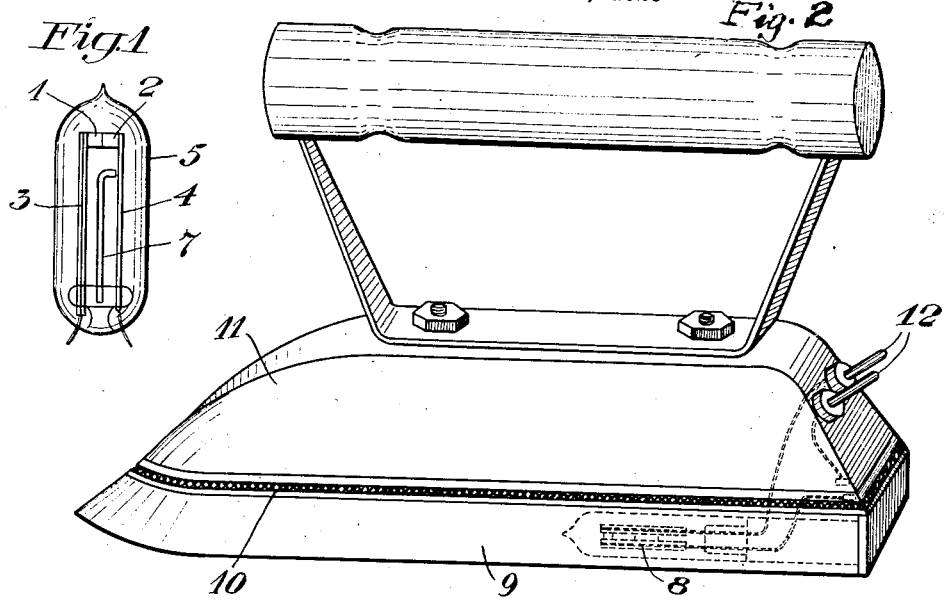
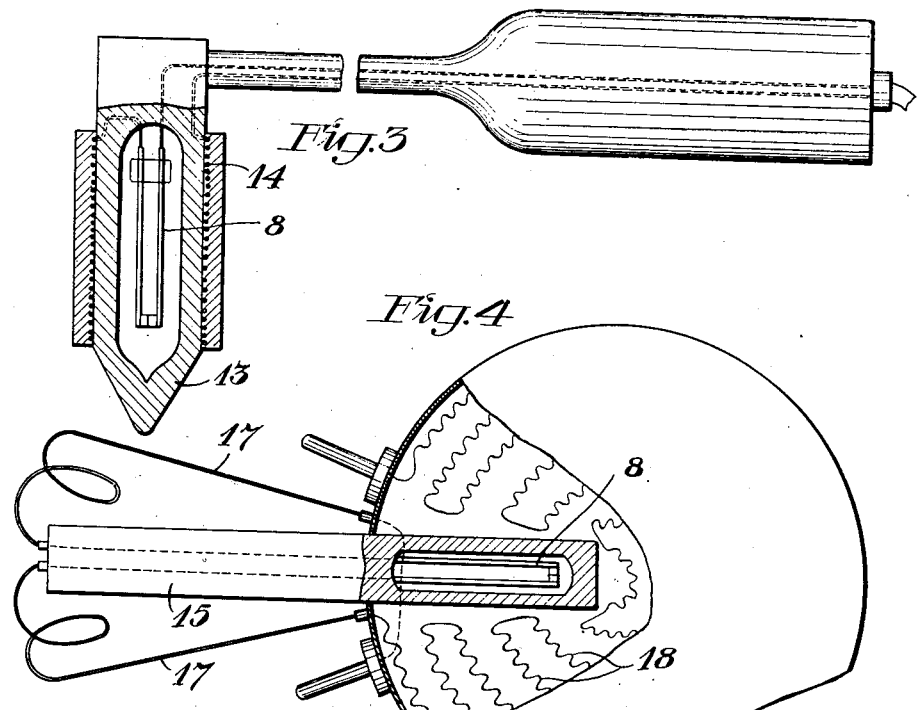
Inventor:
A. O. Appelberg
by Marker Clerk
Attys.

Patented Jan. 22, 1929.

1,699,940

UNITED STATES PATENT OFFICE.

AXEL OSVALD APPELBERG, OF STOCKHOLM, SWEDEN.

THERMOSTATIC SWITCH.

Application filed March 21, 1923, Serial No. 626,673, and in Sweden September 30, 1920.

This invention relates to thermostatic switches for electrically heated flat irons, soldering irons and cooking and similar electrical apparatus.

Heretofore the problem of controlling the supply of electrical energy to electric heating apparatus has not been solved in a rational manner, the waste of energy being very great in the apparatus at present employed. The common method of controlling the supply of energy has been to change the resistance of the heater, the number of changes obtainable having for practical reasons been no more than three at the most, which is insufficient.

The object of the invention is to obtain an automatic control of the electricity supply by periodically interrupting and closing the circuit, so that the apparatus receives only the amount of energy required in each particular instance and is maintained at the desired temperature with the least consumption of energy.

This object is attained according to the present invention by providing a control device consisting of a thermostatic switch disposed within a receptacle, which is evacuated or filled with an inert gas or gaseous mixture, and arranged, or adapted to be arranged, in thermal connection with the heat-emitting part of the apparatus or the substance to be heated and inserted into the heating circuit of the apparatus so that it will interrupt the circuit and cut off the current on a pre-arranged temperature in the said heat-emitting part being exceeded, by reason of a reduced emission of heat or otherwise. A thermostatic switch arranged in this manner is obviously subjected to great stresses through the action of the high temperature, as well as through the influence of repeated interruption of the current. Only by the present invention it has become possible to construct a thermostatic switch capable of withstanding these stresses during a sufficiently long period. Thus, a switch according to the invention may be used as a self-interrupting device in heating apparatus intermittently closing and breaking the electric circuit.

Moreover, a switch according to the invention may conform to very small outer dimensions, which renders it particularly suitable for electric apparatus, such as flat irons, soldering irons and the like. Thus it may easily be disposed in a recess in a heat-emitting part of the apparatus, without the external dimensions of the latter having to be increased.

This feature is attributable to the location of the thermostatic element within an evacuated receptacle, or a receptacle filled with inert gas. Particularly, if the said element consists of a bi-metallic body in the form of a sheet-metal strip or tongue which is attached into the receptacle with its one end while the other end thereof actuates the contacts, the construction of the whole contact arrangement can be made very compact, the enclosing receptacle being preferably made in the form of a tube or bulb of glass or other refractory insulating material in which the bi-metallic body and the contacts are fused in the same way as in incandescent lamps. No special insulating means are then required for the thermostatic element and contacts, as in the apparatus with thermostatic switches heretofore employed, and, consequently, the whole switch may be disposed in the apparatus by simply locating the tube in the place intended for same. Such a switch does not comprise any part that may be injured by heat, nor any parts movable on studs or the like and, consequently, a switch of this type will have great mechanical durability.

The subject matter of this application is shown and described in the application of Appelberg and Gilliver Ser. No. 502,301 filed Sept. 21, 1921.

In the accompanying drawings, Fig. 1 shows by way of illustration or example, one embodiment of a switch according to the invention, whereas Figs. 2, 3 and 4 illustrate various applications of the invention.

In the embodiment illustrated by Fig. 1, the two contacts 1, 2 are arranged at the free ends of two contact tongues 3, 4 which are fused in one end of a tube or bulb 5 which is evacuated or filled with inert gas, one of said tongues, 3, being of bi-metal whereas the other consists of a resilient plate, preferably of steel, tending to keep the contacts 1, 2 closed.

On the temperature rising the bi-metal tongue 3 tends to bend from the resilient tongue 4, and when a predetermined temperature is reached the contacts 1, 2 will be opened to interrupt the current.

The resiliency of the tongue 4 is so adapted that a sufficient contact pressure is obtained between the contacts 1, 2 which are, preferably, made of a metal having a high temperature of gasification, such as tungsten.

If required, the glass tube may be provided with external connection-contacts facilitating the making of connection by inserting the tube into a receptacle in the same manner as an incandescent lamp. The glass tube may also be provided with a metallic protective casing, the supply wires being then preferably led through an extension of said casing for the purpose of connecting the switch to contacts provided in the apparatus.

Fig. 2 shows the invention as applied to an electric flat iron, in order to control the supply of current. To effect a control as quickly as possible, the thermostatic switch 8 is disposed in a recess in the flat iron 9 underneath the heating resistance 10 which is arranged, in known manner, between the upper part 11 and the ironing plate 9. The switch 8 and the resistance 10 are connected in series between the two contact studs 12 by which the flat iron is connected with the supply circuit in known manner; the switch being thus included in the supply circuit so that it will effect a repeated interruption and closing of the circuit as the temperature rises to a certain value and then falls again.

In such an arrangement the amount of current supplied is automatically controlled according to the work done. If the flat iron is standing idle, the current is supplied intermittently so that, for instance, not more than about 15 per cent of the whole current is required to keep the flat iron at a temperature of say 250°. On the other hand, the current may be closed all the time the flat iron is in use. By the employment of such a switch it is also possible to pass a stronger current through the iron, for example, a current twice as large as would otherwise be the case, the current being then continually supplied only on very wet material being ironed.

Fig. 3 illustrates the employment of the thermostatic switch 8 in a soldering iron 13, provided with an external heating resistant 14, the switch being disposed in a recess in the soldering iron proper.

Fig. 4 shows an arrangement of a switch disposed in an electric cooking or hot plate. The switch 8 is arranged within a metal tube 15 which may serve as a handle and is adapted to be extended more or less out of the plate 16, in order to control the temperature. The further the tube containing the switch is pulled out, the higher will the temperature be in the cooking plate. The switch 8 is connected in series with a heating resistance 18 by means of external conductors 17. Another way of controlling the temperature consists in disposing a plurality of switches, adjusted to different temperatures, within the plate, the said switches being connected to a simple change over switch so that the cooking plate may be adjusted, by changing over the said switch, to interrupt the current at various desired temperatures.

What I claim as new, and desire to secure by Letters Patent of the United States of America is:—

1. In electric heat producing apparatus a current supply regulating device consisting of a thermostatic switch inserted in the heating circuit and placed in thermal connection with the apparatus so as to open and close said circuit intermittently at a certain limit of temperature, said switch consisting of a solid thermostatic element sealed in an evacuated receptacle.

2. In electric heat producing apparatus a current supply regulating device consisting of a thermostatic switch inserted in the heating circuit and placed in thermal relation with the apparatus so as to open and close the said circuit intermittently at a certain limit of temperature, said switch consisting of a solid thermostatic element sealed in a receptacle filled with an inert gas.

3. In electric heat producing apparatus a current supply regulating device consisting of a thermostatic switch inserted in the heating circuit and arranged in thermal connection with the apparatus so as to open and close said circuit intermittently at a certain limit of temperature, said switch being sealed in an evacuated glass receptacle and composed of a bi-metallic thermostatic stem and contacts consisting of a refractory metal.

In testimony whereof I affix my signature.

AXEL OSVALD APPELBERG.